United States Patent [19]
Dera et al.

[11] 3,841,681
[45] Oct. 15, 1974

[54] ENERGY ABSORBING DEVICE

[75] Inventors: Alain Dera, Rueil-Malmaison; Michel Fayolle, Paris; Roger Maistrelli, Bougival, all of France

[73] Assignees: Regie Nationale de Usines Renault, Billancourt; Automobiles Peugeot, Paris, both of, France; part interest to each

[22] Filed: June 8, 1973

[21] Appl. No.: 368,458

[30] Foreign Application Priority Data
June 14, 1972 France .......................... 72.21439

[52] U.S. Cl. .................. 293/70, 137/529, 188/280, 188/286, 188/313, 267/116, 293/85, 293/89
[51] Int. Cl. .......................... B60r 19/02, F16f 9/10
[58] Field of Search .............. 293/1, 70, 85, 86, 89, 293/DIG. 3; 267/116; 188/280, 286, 311, 313; 137/529

[56] References Cited
UNITED STATES PATENTS

| | | | |
|---|---|---|---|
| 2,977,146 | 3/1961 | Edwards et al. | 293/86 X |
| 3,494,606 | 2/1970 | Hanchen | 267/116 |
| 3,572,363 | 3/1971 | Roach | 188/280 X |
| 3,718,356 | 2/1973 | Gabella | 293/85 X |

Primary Examiner—Lloyd L. King
Assistant Examiner—Andres Kashnikow
Attorney, Agent, or Firm—Nathaniel A. Humphries

[57] ABSTRACT

An energy absorbing device for connection between an automobile vehicle bumper and chassis, comprising means for memorizing an initial peak pressure in the cylinder and means responsive to said memorized valve for throttling the flow of fluid escaping from a jack cylinder of the device to retain the subsequent pressure prevailing in the jack cylinder at or near said initial peak value.

8 Claims, 4 Drawing Figures

ENERGY ABSORBING DEVICE

The present invention relates to an energy absorbing device.

The use of hydraulic jacks interposed between a bumper and the strengthened load bearing body portion of an automotive vehicle is already known; such a device has the effect of absorbing part of the energy released at the time of an impact between the vehicle and an obstacle. The liquid contained in the cylinder of the bumper jack is urged under the pressure of the bumper piston through calibrated orifices distributed along the cylinder wall and progressively covered by the piston at the rate at which the jack compresses. Such a principle makes the fluid outflow passage cross section dependent on the position of the piston.

At the time of impact the deceleration resulting from braking of the piston by the liquid depends on the calibration of the orifices, on their distribution, and on the mass of the vehicle. If the shock occurs with a mass smaller than that for which the jack has been designed, the deceleration quickly reaches a very high maximum value and then decays very rapidly. On the other hand, if the mass is greater than that for which the jack is intended the initial deceleration is too slow and increases too slowly so that there is a violent shock at the end of the piston travel.

Consequently this method of energy absorption does not give satisfaction.

The present invention provides a device intended to obviate the above disadvantages by eliminating the incidence of a high peak of initial deceleration followed by lower subsequent deceleration values, thereby enabling a virtually constant deceleration o the piston regardless of the mass of the vehicle to be arrested.

According to the present invention there is provided an energy absorbing device comprising at least one hydraulic jack adapted to be connected so as to compress under shock load, means for memorizing an initial value of the pressure in the cylinder during jack compression, and means responsive to said initial memorized pressure value for throttling the escape flow of hydraulic fluid from the jack cylinder during substantially all the subsequent travel of the piston along the cylinder of said jack.

In order that the present invention may more readily be understood, the following description is given merely by way of example, reference being made to the accompanying drawings in which.

Figure 1:
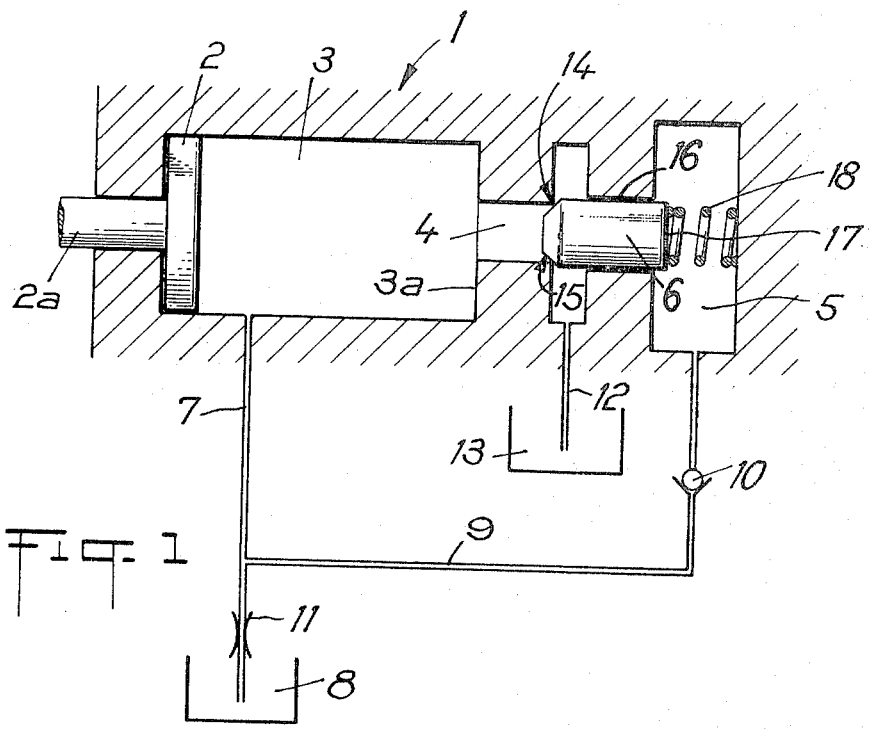
FIG. 1 is a schematic view of one embodiment of the energy absorbing device according to the invention.

In FIG. 1 there is shown an energy absorbing device comprising a jack 1 having a piston 2 the rod 2a of which is integral with a member subjected to shock, for example a vehicle bumper. The piston 2 is slidingly mounted in a cylinder 3 which contains a commercial hydraulic fluid such as an oil generally used for this purpose.

The liquid issuing under high pressure from the cylinder 3 flows through a conduit 12 into a reservoir 13 through a main passage 4 which is opened and closed by movement of a valve member 6 slidably mounted in a bore 16. The conical front portion 15 of the valve member 6 is adapted to come into sealing contact with a seat 14 provided at the outlet of the main passage 4. The position of the valve member 6 is determined by the pressure exerted on its rear surface 17 exposed to a chamber 5 which is also connected to the cylinder 3 of the jack, as will be described hereafter.

A secondary circuit 7 connected to a reservoir 8 for hydraulic fluid allows the fluid to escape from the cylinder 3 toward the reservoir 8 during a fraction of the early part of the piston travel. By virtue of the pressure drop resulting from the presence of a restriction 11 disposed in the conduit 7, some of the hydraulic fluid bleeds off along a communicating conduit 9 and through a one way valve 10 in the conduit 9 so as to enter, and to accumulate in, the chamber 5. Return flow from chamber 5 along conduit 9 is prevented by closure of the one way valve 10. The hydraulic fluid present in the chamber 5 acts on the rear surface 17 of the valve 6 which is displaced leftwardly as a result of the pressure prevailing in said chamber.

The chamber 5 must act as a pressure accumulator to sense and memorize the maximum pressure prevailing in the cylinder 3 prior to closure of the conduit 7 during rightward movement of the piston 2. The stored pressure should also be capable of subsequently displacing the valve member 6 leftwardly to cause its front face 15 to approach the seating rim 14 in order to throttle down the fluid flow between cylinder 3 and reservoir 13 along main passage 4 after the conduit 7 has shut off.

In order for this subsequent throttling displacement of valve member 6 to be possible when the pressure in jack cylinder 3 is less than the "memorized" pressure in the chamber 5, the accumulator must be capable of resilient energy absorption. Thus either the hydraulic liquid must be at least slightly compressible, or the walls of the chamber 5 must be to some extent resilient or, as in this case, an air space must remain at the top of the chamber 5 to allow the trapped air to compress as the accumulator is charged, The operation of the device according to FIG. 1 takes place in two stages:

During the early part of the impact, the violence of the shock is measured as a pressure in the cylinder 3 which is memorized in the chamber 5 as the piston moves from its initial position shown in FIG. 1 to a position in which it closes off the conduit 7. This happens because the pressure prevailing in the cylinder 3, reflecting the violence of the shock, is transmitted to the chamber 5 via the conduits 7 and 9 and the one way valve 10 which opens only in the flow direction toward the chamber 5. The valve member 6 therefore rests on its seat 14, for example under the action of a spring 18.

The pressure which now prevails in the chamber 5 is maintained by the action of the one way valve 10 preventing fluid flow back to the cylinder 3 or the reservoir 8, and this pressure also reflects the internal pressure of the jack 1. This pressure is proportional to the square of the rate of displacement of the piston 2, i.e., to the energy of the shock.

Simultaneously with the fluid flow through the conduit 7, because the pressure in the cylinder has pushed the valve member 6 toward the right, the valve member 6 lifts off its seat 14 thus permitting a portion of the hydraulic fluid from the cylinder 3 to flow also through the conduit 12 into the reservoir 13, the rate of this flow being proportional to the degree of opening of the valve member 6.

The second period of operation of the device corresponds to absorption of the shock energy by braking the piston 2 from a position opposite the conduit 7 to its arrival at the end 3a of the cylinder 3. During this phase all the flow of the fluid takes place exclusively by way of the main passage 4 as the conduit 7 is now behind the piston 2 and therefore closed off from the high pressure side of the piston. Therefore, it should be understood that chamber 5 constitutes a force exerting control means which provides a control force acting on valve 6 in proportion to the initial value of pressure in the cylinder to maintain substantially constant pressure in the cylinder during the remainder of travel of the piston.

The pressure in the cylinder 3 will now be controlled in dependence on the pressure memorized in the chamber 5. In fact when, for a given opening of the valve member 6 relative to its seat 14, the hydraulic fluid flow rate begins to diminish as a result of decay of the rate of displacement of the piston 2, the pressure in the cylinder 3 and on the front surface of valve member 6 falls. However, under the effect of the pressure still memorized resiliently in the chamber 5 the valve member 6 will be urged towards its seat 14 to throttle the flow of liquid into reservoir 13 so that the liquid pressure of the liquid in the jack 1 is maintained at approximately its initial value during retardation of the piston 2.

Finally, when the piston 2 stops, the valve 6 is closed off by the "memorized" pressure in chamber 5.

Thus the desired effect is obtained by this self-regulating device, in that a shock imparted under a given pressure is absorbed with transmission of constant forces to the structure of the vehicle.

Depending on the violence of the shock experienced, the pressure device operates under greater or lesser pressures in the jack 1 and the chamber 5, these pressures being functions of the rate of impact. However, the deceleration are always of a constant nature having average g values lower than the peaks obtained with the prior art devices giving a variable deceleration profile.

Figure 2:
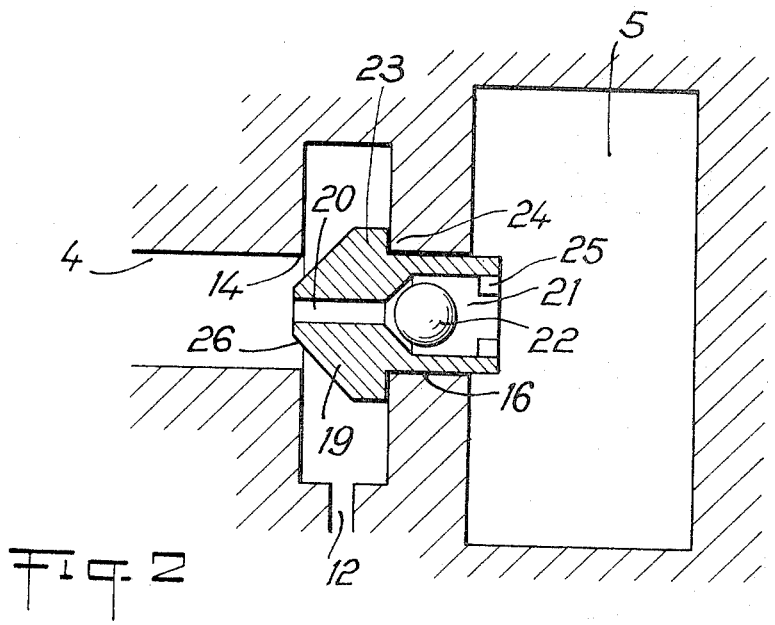
FIG. 2 is a variant of the energy absorbing device.

The device shown in FIG. 2 is a simplified variant of that of FIG. 1.

However the conduit 7 is not incorporated in this embodiment and for reasons of clarity of the drawing, the piston 2 and the cylinder 3 being identical to those of FIG. 1 are not shown.

In this embodiment, the memorizing of the initial pressure in the cylinder 3 is independent of the position of the piston 2 since the passage of liquid from the cylinder 3 and the chamber 5 takes place axially through the valve member 19 mounted, like the valve 6 slidably in the bore 16. More particularly the "memorizing" flow is by way of a conduit 20 the opening of which is controlled by a valve 21 comprising an obturating member formed by the ball 22.

Operation of this embodiment is otherwise analogous to that of FIG. 1.

When, as a result of a shock on the piston rod 2a (not shown), the piston creates an excess pressure in the cylinder 3 the valve 19 is displaced rightwardly until the shoulder 23 abuts against the edge 24 of the valve housing and simultaneously the ball 22 of the obturator valve 21 is pushed back against the bosses 25 to permit unidirectional "memorizing" flow of liquid from the cylinder 3 toward the chamber 5.

As indicated before, this is allowed by resilient deformation of the chamber 5 or slight compressibility of the hydraulic fluid or the existence of trapped air in the chamber 5.

During the advance of the piston 2 the liquid is discharged via the main passage 4 between the valve 19 and its seat 14 and then through the conduit 12 into the reservoir 13. When the rate of piston advance decays and the fluid flow in the passage 4 reduces from its maximum value "memorized" in chamber 5 there will be a pressure differential on valve member 19 causing it to move leftwardly towards its seat 14. The cross sectional area of the liquid escape opening from the main passage 4 thus reduces to maintain the fluid pressure in the jack 1 virtually constant relative to the beginning of the operation. In this case too the transmission of the forces in the structure of the vehicle remains constant.

Figure 3:
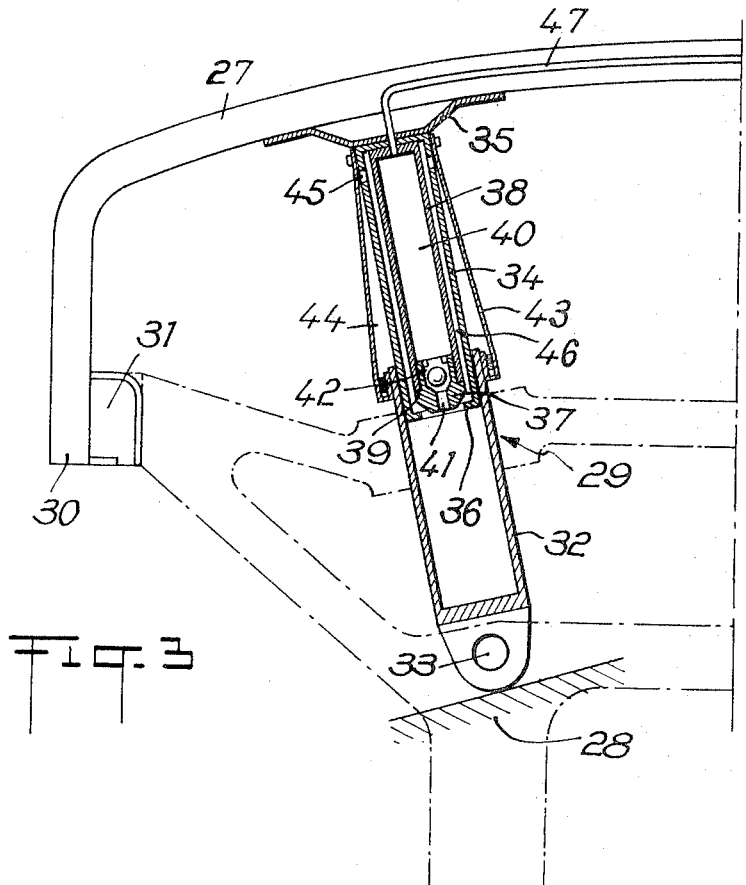
FIG. 3 is a partial view of a bumper mounted on a vehicle through the intermediary of a jack equipped with a device according to the invention.

FIG. 3 shows a mode of application of the shock absorbing device in an assembly comprising jacks, a bumper and a vehicle chassis.

As is shown in FIG. 3, a bumper 27 is connected to the vehicle chassis 28 through the intermediary of hydraulic jacks 29. The ends 30 of the bumper are rendered integral with the chassis at fixed points 31, more particularly by means of resilient elements permitting some reciprocatory movement.

One of the jacks 29 is shown in FIG. 3 and comprises a cylinder 32 containing a suitable hydraulic fluid and articulated to the chassis 28 by a vertical pin 33. In the cylinder 32 there is slidingly mounted a first tubular member 34 closed at its rear portion and secured to the bumper 27 by means of flexible metal leaves 35.

At its front end which is received in the cylinder 32, the first tubular member 34 has a flanged edge 36 such as to constitute a piston having a working face with an opening adapted to be closed by a valve member 37 capable of bearing against the edge 36 which forms a front seat. This valve member 37 is identical with the valve 19 and is slidingly mounted at the front end of an inner tubular member 38 coaxially disposed within the piston-forming first or outer tubular member 34. The end edge 39 of the tubular member 38 constitutes a rear seat for the valve 37. The internal space 40 within the tubular member 38 forms a slightly deformable chamber similar to the chamber 5 of FIGS. 1 and 2 and is adapted to communicate with the interior of the cylinder 32 axially through the valve member 37 via a passage 41 containing a one way ball valve 42 which only allows liquid to pass in the direction from the cylinder 32 towards the chamber 40.

Around the tubular member 34 there is secured an envelope 43 defining a tank 44 which is in communication with the annular space 46 between the outer and inner tubular members 34 and 38 by means of orifices 45 provided in the wall of the outer tubular member 34 to permit the liquid expelled from the cylinder 32 to escape towards the tank 44 as the tubular member 34 is displaced along the cylinder 32.

Upon impact the outer tubular member 34 plunges into the cylinder 32, the valve member 37 resting on its rear seat 39. Since the liquid can pass through the valve member 37 the initial pressure is memorized in the chamber 40.

As the bumper 27 recoils, the liquid from the cylinder 32 escapes through the annular passage between the valve 37 and the edge 36 towards the annular space 46 and through the orifices 45 into the tank 44.

As the rate of displacement of the tubular member 34 allows the pressure in the cylinder 32 to drop below the pressure memorized in the chamber 40, the valve member 37 moves toward its seat formed by the flange 36 to restrict the fluid flow passage and consequently to re-establish a higher pressure in the cylinder 32 which pressure consequently, as in the case of the preceding Figures, is thus controlled to remain virtually constant until the valve member 37 closes against the seat 36.

When several jacks 29 are employed, the various chambers 40 are interconnected by a conduit 47 opening at their rear portions.

Figure 4:
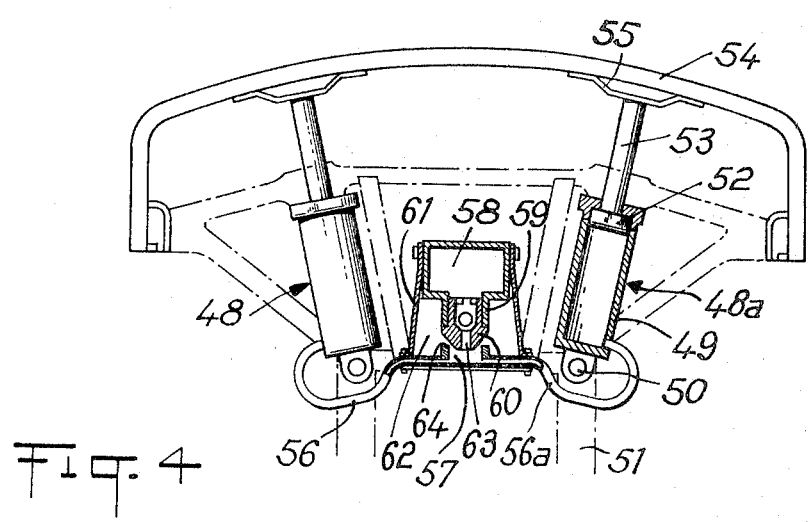
FIG. 4 is a plan view of a bumper mounted on a vehicle through the intermediary of a plurality of jacks all of which are connected to a single device according to the invention.

FIG. 4 shows an improvement to the device of FIG. 3 wherein a single control device is utilised for a plurality, in this case a pair, of conventional jacks 48, 48a. These jacks each comprise a cylinder 49 articulated to the chassis 41 about a pin 50, and a piston 52 whose piston rod 53 is secured to the bumper 54 through the intermediary of resilient metal leaves 55.

The bases of the cylinders 49 of the jacks 48, 48a are communicated by conduits 56, 56a with a common control device attached to the chassis 51 and comprising an ante-chamber 57 into which the conduits 56, 56a open, a hydraulic "memory" chamber 58 provided with a conduit 59 and, slidably mounted in conduit 59, a valve member 60 identical with the valve member 19 in FIG. 2 and containing a central passage and a one way obturator ball valve. A flesible envelope 61 is secured on the chamber 58 and defines a tank 62 adapted to be communicated with the ante-chamber 57 under the control of the member 60.

As previously described, when a shock is transmitted by the bumpers 54 to the pistons 52 of the jacks 48, 48a the resulting rise in liquid pressure in the cylinders 49 is transmitted via the conduits 56, 56a to the ante-chamber 57 whereupon the conduit 63 of the valve member 60 opens. The valve member 60 then rests on its seat and the initial pressure is thus memorized in the chamber 58.

When during the movement of the pistons 52 in the jacks 48, 48a, the jack pressure drops below the initial already "memorized" pressure valve this reduced jack pressure which also prevails in the ante-chamber 57 permits the valve member 60 to move towards its front seat formed by the rim 64 of the ante-chamber 57 under the thrust of the higher pressure prevailing in the chamber 58.

As a result, the fluid escape flow rate from the jacks into the ante-chamber 57 is reduced and the pressure in the cylinders 49 is retained at a value near the initial pressure, bringing about a virtually constant deceleration of the vehicle.

We claim:

1. An energy absorbing device comprising at least one hydraulic jack having a cylinder, a piston slidable within said cylinder to enable displacement from a starting position toward a second position allowing the jack to compress under shock load, force exerting control means for providing a control force in proportion to the initial value of the pressure in the cylinder during initial jack compression, outlet conduit means for fluid expulsion during jack compression, and throttling means responsive to said control force for throttling the escape flow of hydraulic fluid from the cylinder along said conduit to maintain substantially constant pressure in said cylinder during substantially all the subsequent travel of said piston along said cylinder.

2. The energy absorbing device of claim 1, wherein said force exerting control means comprises a chamber, a conduit extending between said cylinder and said chamber, and said throttling means including a movable control valve member in said conduit connected to be subjected to the pressure of fluid contained in the chamber.

3. The energy absorbing device of claim 2, wherein said conduit includes a bore opening into said chamber and said valve member is slidably mounted in said bore, said valve member has one end face disposed to be subjected to the action of fluid in said chamber and an opposite end face which has a conical portion, and wherein said conduit includes a valve seat disposed to cooperate sealingly with said conical portion of said valve member.

4. The energy absorbing device of claim 2, additionally including a communicating conduit connecting the chamber to the cylinder of the jack, and a non-return valve in said communicating conduit allowing passage of hydraulic fluid only along a direction towards the chamber, said communicating conduit opening into the cylindrical wall of the jack cylinder in a position spaced a relatively small distance toward said second position from said piston when said piston is in said starting position so that said piston is capable of sufficient advance from said starting position to build up the maximum pressure in the cylinder before blocking off said communicating conduit.

5. The energy absorbing device of claim 2, additionally including a conduit passing through said valve member and connecting said jack cylinder to said chamber, and a non-return valve in said conduit allowing passage of fluid only in a direction towards said chamber.

6. The combination of the energy absorbing device of claim 1 and an automobile vehicle having a bumper and a chassis including an articulation connection at one end of said cylinder mounted on the vehicle chassis; a mobile assembly including a resilient metal leaf assembly secured to the vehicle bumper, said mobile assembly further comprising a first tubular member slidably mounted in the jack cylinder; a flanged edge at one end of said first tubular member forming a piston with an open working face; an inner tubular member integral with said first tubular member and disposed coaxially therein to form a hydraulic chamber and which has one end facing the cylinder; a valve seat edge at said one end of the inner tubular member; a longitudinally movable valve slidable in said inner tubular member and adapted to come into seating engagement with either said flanged edge of the first tubular member or the said valve seat edge of the inner tubular member; a longitudinal passage in the valve member; a non-return valve in said longitudinal passage; an evelope disposed around the first tubular member; and at least one orifice in the first tubular member communicating said envelope with the space between the first and inner tubular members.

7. The combination which claim 6, additionally including a plurality of said energy absorbing devices disposed between the vehicle chassis and bumper, and a means connecting the space within the inner tubular member of one of said energy absorbing devices to the corresponding space of another of said energy absorbing devices.

8. The combination of claim 1, additionally including a plurality of said hydraulic jacks connected between a vehicle chassis and bumper; means connecting the cylinders of the jacks to a common control device which includes said force exerting control means and said throttling means; said common control device comprising a pressure chamber; a conduit communicating with said pressure chamber; a valve member slidably mounted in said conduit; a liquid reservoir; a passage arranged to communicate said jack cylinders with said reservoir, said valve member being effective to throttle the flow of liquid along said passage in response to pressure in the said chamber; a longitudinal conduit in said valve member; and a non-return valve in said longitudinal conduit for communicating said chamber with the jack cylinder.

* * * * *